(12) United States Patent
Naik et al.

(10) Patent No.: US 10,798,160 B2
(45) Date of Patent: Oct. 6, 2020

(54) RESOURCE MANAGEMENT IN A CLOUD ENVIRONMENT

(71) Applicant: HEWLETT PACKARD ENTERPRISE DEVELOPMENT LP, Houston, TX (US)

(72) Inventors: Roshan Keshav Naik, Karnataka (IN); Anbarasu Vellay Gounder, Karnataka (IN); Veeresh Basappa Babaleshwar, Karnataka (IN)

(73) Assignee: MICRO FOCUS LLC, Santa Clara, CA (US)

( * ) Notice: Subject to any disclaimer, the term of this patent is extended or adjusted under 35 U.S.C. 154(b) by 332 days.

(21) Appl. No.: 15/660,348

(22) Filed: Jul. 26, 2017

(65) Prior Publication Data

US 2018/0248941 A1 Aug. 30, 2018

(30) Foreign Application Priority Data

Feb. 28, 2017 (IN) .............................. 201741007104

(51) Int. Cl.
| | |
|---|---|
| *H04L 29/08* | (2006.01) |
| *H04L 12/26* | (2006.01) |
| *H04W 4/021* | (2018.01) |
| *H04L 12/24* | (2006.01) |

(52) U.S. Cl.
CPC ...... *H04L 67/1031* (2013.01); *H04L 41/0823* (2013.01); *H04L 41/0896* (2013.01); *H04L 43/04* (2013.01); *H04L 43/0876* (2013.01); *H04W 4/021* (2013.01); *H04L 41/147* (2013.01); *H04L 67/1097* (2013.01); *H04L 67/22* (2013.01)

(58) Field of Classification Search
CPC ............. H04L 67/1031; H04L 41/0823; H04L 41/0896; H04L 43/0876; H04L 43/04; H04L 67/22; H04L 41/147; H04L 67/1097; H04W 4/021
See application file for complete search history.

(56) References Cited

U.S. PATENT DOCUMENTS

| | | |
|---|---|---|
| 8,271,057 B2 | 9/2012 | Levine et al. |
| 9,154,574 B2 | 10/2015 | Boss et al. |
| 2013/0219067 A1* | 8/2013 | Boss .................... H04L 67/306 709/226 |

(Continued)

OTHER PUBLICATIONS

Ngenzi, A., "Dynamic Resource Management in Cloud Data Centers for Server Consolidation." arXiv preprint arXiv:1505.00577, May 4, 2015, 8 pages.

*Primary Examiner* — Soe Hlaing

(57) ABSTRACT

Resource management in a cloud environment is disclosed. One example is a system including at least one processor and a memory storing instructions executable by the at least one processor to receive an action trigger indicative of a status of a user from a source application, wherein the source application includes a mobile application, a biometric application or a geo-fencing application, retrieve an activity status for a resource of a plurality of resources in a hybrid cloud environment, and provide, based on the action trigger and the activity status, a recommendation for deployment or non-deployment of the resource to achieve resource efficiency.

18 Claims, 4 Drawing Sheets

(56) References Cited

U.S. PATENT DOCUMENTS

| | | | |
|---|---|---|---|
| 2014/0280946 A1* | 9/2014 | Mukherjee | H04L 67/16 |
| | | | 709/226 |
| 2015/0358333 A1* | 12/2015 | Cronin | H04L 63/0861 |
| | | | 726/7 |
| 2016/0006744 A1 | 1/2016 | Du et al. | |
| 2016/0094622 A1 | 3/2016 | Thomas et al. | |
| 2017/0005967 A1* | 1/2017 | Simpson | G06F 16/9535 |
| 2017/0250918 A1* | 8/2017 | Billore | G06F 3/067 |

* cited by examiner

RESOURCE MANAGEMENT IN A CLOUD ENVIRONMENT

CROSS REFERENCE TO RELATED APPLICATION

This application claims the benefit of Indian Application No. 201741007104 filed Feb. 28, 2017, which is hereby incorporated by reference.

BACKGROUND

A hybrid cloud environment may deploy a large number of resources of varying types, such as compute, storage and networking. Usage attributes may be associated with these resources, and may be stored in data structures.

DETAILED DESCRIPTION

Figure 1:
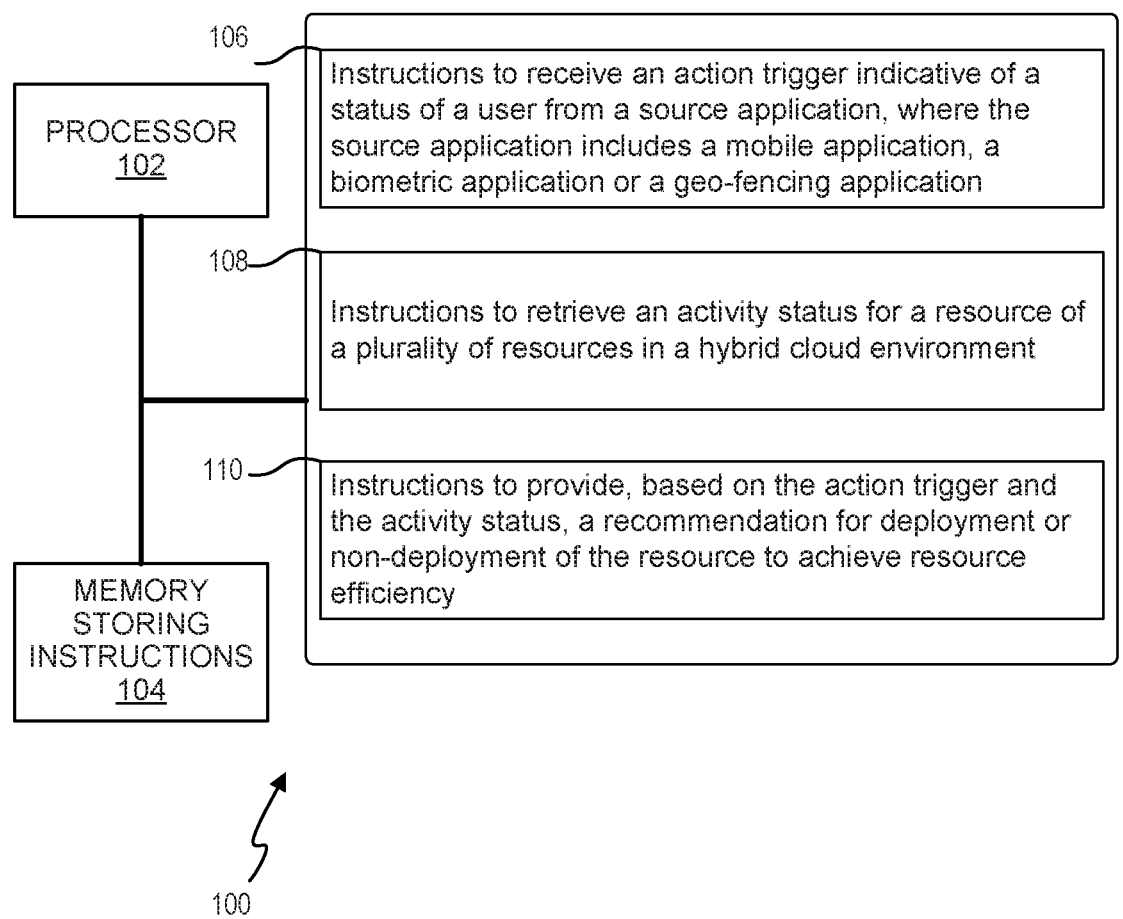
FIG. 1 is a block diagram illustrating one example of a system for resource management in a cloud environment.

Cloud based data center consists of various components such as compute, storage and networks. Instances may be created for users, organizations, and so forth. For example, a developer or a testing community may create a compute resource. The need for on-demand computing has considerably changed the way IT infrastructures and data centers operate. For example, companies have started to rely more and more on cloud-based resources that augment their in-house data centers, and may span across multiple geographic regions.

Generally, due to the continuous, on-demand need for resources, instances that are created may continue to run even when they are not being utilized. For example, the compute instances created by the developer may continue to consume resources, such as compute time, network bandwidth, cloud resources, and so forth, even when the instances are not being actively utilized. As such, valuable resources may be consumed that incur significant costs for an organization.

For example, a company may have geographically diverse work locations that each spawn a large number of on-demand instances. However, as employees leave the workplace during after-hours, their respective instances continue to be available even though they are not actively utilizing them. A similar situation may occur if a team completes a particular project and moves on to a different one, or if an employee leaves a company.

These unused resources may be utilized more efficiently by the company. For example, while employees at a first geographic location may not be utilizing their respective instances, employees at a second geographic location may be able to utilize such unused resources. For example, employees at the second geographic location may need more compute resources, or more storage resources, or may need to spawn instances to meet their deliverables, but are unable to do so since their available resources have reached a maximum capacity in their private cloud setup.

Generally, it becomes increasingly difficult to re-allocate or reclaim such resources, since many of the available resources may not be suitable or adequate for deployment for the intended purpose. Instead, it may be efficient to reclaim resources that are not in active use and re-allocate them. This practice will generally be cost-effective as well. However, it may take time to manually identify which resources may be reclaimed or re-allocated.

Accordingly, there is a need to significantly reduce the operational business costs by optimizing the usage of existing resources by identifying and reclaiming them. As proposed herein, this may be achieved by automatically identifying when certain resources need to be initialized or shut down based on usage data of these resources.

As described in various examples herein, resource management in a cloud environment is disclosed. One example is a system including at least one processor and a memory storing instructions executable by the at least one processor to receive an action trigger indicative of a status of a user from a source application, wherein the source application includes a mobile application, a biometric application or a geo-fencing application, retrieve an activity status for a resource of a plurality of resources in a hybrid cloud environment, and provide, based on the action trigger and the activity status, a recommendation for deployment or non-deployment of the resource to achieve resource efficiency.

In the following detailed description, reference is made to the accompanying drawings which form a part hereof, and in which is shown by way of illustration specific examples in which the disclosure may be practiced. Other examples may be utilized, and structural or logical changes may be made without departing from the scope of the present disclosure. The following detailed description, therefore, is not to be taken in a limiting sense, and the scope of the present disclosure is defined by the appended claims. Features of the various examples described herein may be combined, in part or whole, with each other, unless specifically noted otherwise.

FIG. 1 is a block diagram illustrating one example of a system 100 for resource management in a cloud environment. System 100 is shown to include a processor 102, and a memory 104 storing instructions 106-110 to perform various functions of the system 100.

The term "system" may be used to refer to a single computing device or multiple computing devices that communicate with each other (e.g. via a network) and operate together to provide a unified service. In some examples, the components of system 100 may communicate with one another over a network. As described herein, the network may be any wired or wireless network, including a network of cloud computing resources, and may include any number of hubs, routers, switches, cell towers, and so forth. Such a network may be, for example, part of a cellular network, part of the internet, part of an intranet, and/or any other type of network.

Memory 104 may store instructions 106 to receive an action trigger indicative of a status of a user from a source application, where the source application includes a mobile application, a biometric application or a geo-fencing application. Generally, a source application is any application that provides user data for a user associated with a resource. For example, the source application may be an application running on a user's mobile device. As another example, the source application may be a biometric application that is to receive a user's biometric data. Also, for example, the source application may be a geo-fencing application that provides a user's location data.

A mobile application may recognize that a user has become active and is about to use a cloud resource. The mobile application may be configured in different ways to generate the action trigger. For example, when the user's mobile device connects to the office Wi-Fi, the wireless application may generate an action trigger.

Geo-fencing is a practice of utilizing technology, such as a global positioning system (GPS) or a radio frequency identification (RFID), to define a geographic boundary. A geo-fencing application may generate an action trigger based on a presence or absence of an employee in a work environment, unavailability of an employee during off-work hours or during the weekend, underutilization of a resource by an employee, and so forth.

Biometric verification is generally any means by which a user may be uniquely identified by evaluating a distinguishing biological trait. A biometric application may generate an action trigger based on biometric verification of presence or absence of a user, such as, for example, a finger print or retina scan.

In some examples, the instructions to receive the action trigger may include further instructions to determine that the action trigger is not received from a first source application, and prompt another source application to provide the action trigger. For example, if one of the mobile application, the biometric application or the geo-fencing application fails to generate a trigger, the other ones may generate the trigger. Also, for example, if all the three source applications fail to generate an action trigger, an activity monitor or predictive engine may continue to perform resource optimization and generate alerts and recommendations and/or notifications to system administrators.

Memory 104 may store instructions 108 to retrieve an activity status for a resource of a plurality of resources in a hybrid cloud environment. In some examples, a user may schedule a task or perform operations in cloud resources when the user is not physically present. For example, a system update, downloading a file, or installing a software are some activities that may be performed in the absence of the user.

In some examples, memory 104 may store instructions 108 to collect usage data for the plurality of resources in the hybrid cloud environment, and store the usage data in a repository. The usage of resources in a hybrid cloud environment may be monitored (using monitor software). This data may be collected over a period of time and stored in a repository. A user may be able to configure the monitoring parameters. In some examples, the monitoring software may generate a message if the resources are idle.

In some examples, memory 104 may store instructions 108 to detect a pattern based on the collected usage data. For example, over a period of time, say, a week or a month the data collected in the repository may be used to detect a pattern. This may provide information on what resources are used at what times. For example compute and network resources may be used extensively from 9 AM to 5 PM. However, after 5 PM, the compute resources may be idle but storage resources may be active as some backup tasks or disk maintenance tasks or antivirus scan tasks may be in progress. Such patterns may be detected and stored in a repository. For example, a predictive analysis engine may analyze the data from the repository and arrive at a pattern. The pattern may then be used to reduce the network bandwidth in evenings and weekends, and automatically turn on resources for the users in the morning.

Memory 104 may store instructions 110 to provide, based on the action trigger and the activity status, a recommendation for deployment or non-deployment of the resource to achieve resource efficiency. For example, the action trigger may terminate resource commands for resources in a hyper-converged and hybrid cloud environments, if an employee is not at work for more than a threshold number of days, thereby reclaiming valuable IT resources, and controlling cost, and reaching optimum efficiency. For example, when the user of a cloud resource arrives at the office premise, resources associated with the user may be automatically activated. Likewise, when the user moves away from the premises, the resources associated with the user may be automatically terminated or hibernated depending on the settings.

Also, for example, a biometric application may be utilized to generate an action trigger, so that resources associated with a specific user may be identified, and stopped or started, based on for example, presence or absence of the user. This may be determined based on a fingerprint or retina scan.

In some examples, a mobile application may be utilized to identify the user of a cloud resource. The mobile application may have user details mapped to the provisioned and/or allocated resources, and every time the user moves into or out of a work location, the mobile application may trigger the resource to be on or off based on a connectivity to office Wi-Fi (e.g., trigger via IP/MAC address).

In some examples, the instructions to provide the recommendation for deployment or non-deployment of the resource may be based on the detected pattern. For example, if it is determined that additional bandwidth is to be allocated to a collection of network resources in a certain country during the hours of 8 A.M. to noon, then the network resources may be automatically made available during those hours. Also, for example, additional traffic utilizing those network resources may be diverted to a different collection of network resources.

In some examples, the instructions to provide the recommendation for deployment or non-deployment of the resource may include instructions to reallocate or reclaim the resource. For example, based on usage data of compute resources, system 100 may provide a recommendation to a network administrator to not provision additional cloud resources, and instead utilize available in-house data centers. This may result in significant reduction in operational costs.

In some examples, the instructions to provide the recommendation for deployment or non-deployment of the resource may be based on a usage policy. Several different usage policies may be configured into system 100. For example, idle resources associated with a user may be identified during after-hours. This may be based on determining user availability via a source application. The system administrator may be notified, and an automatic action may be triggered, such as to start, stop, or pause an instance. As another example, a weekend policy may identify users that are available over the weekend, identify resources that are idle during the weekend and automatically trigger a start, stop, or pause of an instance. As another example, a long leave policy may identify users that are on a long leave, identify associated resources that may be idle during that time, and automatically trigger a start, stop, or pause of an instance. Also, for example, a reclaim policy may identify users who are no longer with an organization, and identify and reclaim associated resources.

Figure 2:
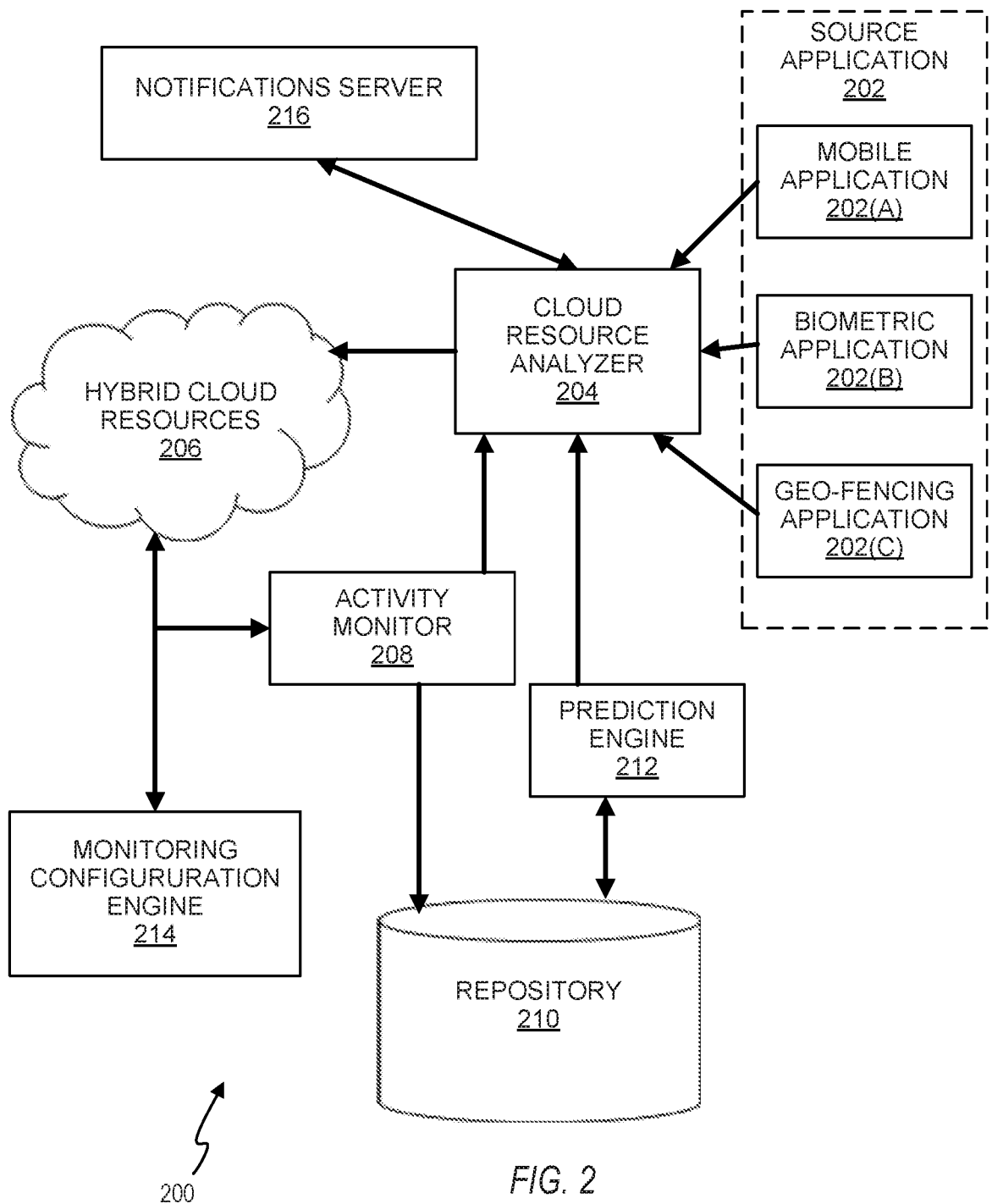
FIG. 2 is a block diagram illustrating another example of a system for resource management in a cloud environment.

FIG. 2 is a block diagram illustrating another example of a system 200 for resource management in a cloud environment. System 200 described with reference to FIG. 2 may share some aspects of system 100 as described with reference to FIG. 1.

System 200 includes a cloud resource analyzer 204 that is communicatively linked to a source application 202, hybrid cloud resources 206, a prediction engine 212, an activity monitor 208, and a notification server 216. A monitoring configuration engine 214 is linked to the hybrid cloud resources 206 and the activity monitor 208. The activity monitor 208 and the prediction engine 212 may access the repository 210.

As described herein, the source application 202 may include a mobile application 202(A), a biometric application 202(B), or a geo-fencing application 202(C). The cloud resource analyzer 204 may receive an action trigger indicative of a status of a user from a source application 202. The cloud resource analyzer 204 may retrieve, from the activity monitor 208, an activity status for a resource of a plurality of resources 206 in a hybrid cloud environment. The cloud resource analyzer 204 may provide, based on the action trigger and the activity status, a recommendation for deployment or non-deployment of the resource to achieve resource efficiency. The recommendation may be provided to a notifications server 216. The notifications server 216 may generate a report or an email and send that to a system administrator.

In some examples, the cloud resource analyzer 204 may interact with a policy server (not shown in the figure). As described herein, the policy server may maintain usage policies associated with users and resources in the hybrid cloud environment. For example, as soon as the user of the hybrid cloud resource arrives at the office premises, the associated resources are automatically activated. When the user moves away from the premises, the resources may be automatically terminated or hibernated depending on the policy server settings. The presence or absence of the user may be identified in several ways via the source application 202, such as the mobile application 202(A), the biometric application 202(B), or the geo-fencing application 202(C).

In some examples, the cloud resource analyzer 204 may interact with the activity monitor 208. The activity monitor may access the monitoring configuration engine 214 to identify resources that are idle, and/or resources that are at optimal capacity. For example, when instances are provisioned, the monitoring configuration engine 214 may automatically deploy a monitoring probe to the provisioned instances and keep track of server resources such as memory consumption, CPU load, and disk usage. The monitoring configuration engine 214 may monitor usage of resources in the hybrid cloud environment using a monitor software. In some examples, users may also be able to configure the monitoring parameters. The activity monitor 208 may access such usage data and provide it to the repository 210 for storage, and to the cloud resource analyzer 204. Accordingly, the cloud resource analyzer 204 may either take an automatic decision to stop, start or pause a resource, or provide a recommendation via the notifications server 216 to stop, start or pause a resource.

In some examples, the cloud resource analyzer 204 may interact with the prediction engine 212. The repository 210 may store usage data (e.g., activity logs) received from the activity monitor 208, and also past patterns detected by the prediction engine 212. The prediction engine 212 may access the repository 210 to analyze the data and detect patterns. This pattern may be used to reduce the network bandwidth, for example, in evenings and weekends. The detected patterns may also be used to automatically turn on a resource in the morning for users arriving at the workplace. In some examples, based on the detected patterns, the cloud resource analyzer 204 may interact directly with the hybrid cloud resources 206 to reclaim or re-provision resources. In some examples, the cloud resource analyzer 204 may provide a recommendation via the notifications server 216 to stop, start or pause a resource.

The components of system 100 or system 200 may be computing resources, each including a suitable combination of a physical computing device, a virtual computing device, a network, software, a cloud infrastructure, a hybrid cloud infrastructure that may include a first cloud infrastructure and a second cloud infrastructure that is different from the first cloud infrastructure, and so forth. The components of the system may be a combination of hardware and programming for performing designated functions. In some instances, each component may include a processor and a memory, while programming code is stored on that memory and executable by a processor to perform a designated function.

Generally, the components of system 100 or system 200 may include programming and/or physical networks to be communicatively linked to other components of each respective system. In some instances, the components of each system may include a processor and a memory, while programming code is stored and on that memory and executable by a processor to perform designated functions.

Generally, the system components may be communicatively linked to computing devices. A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 3:
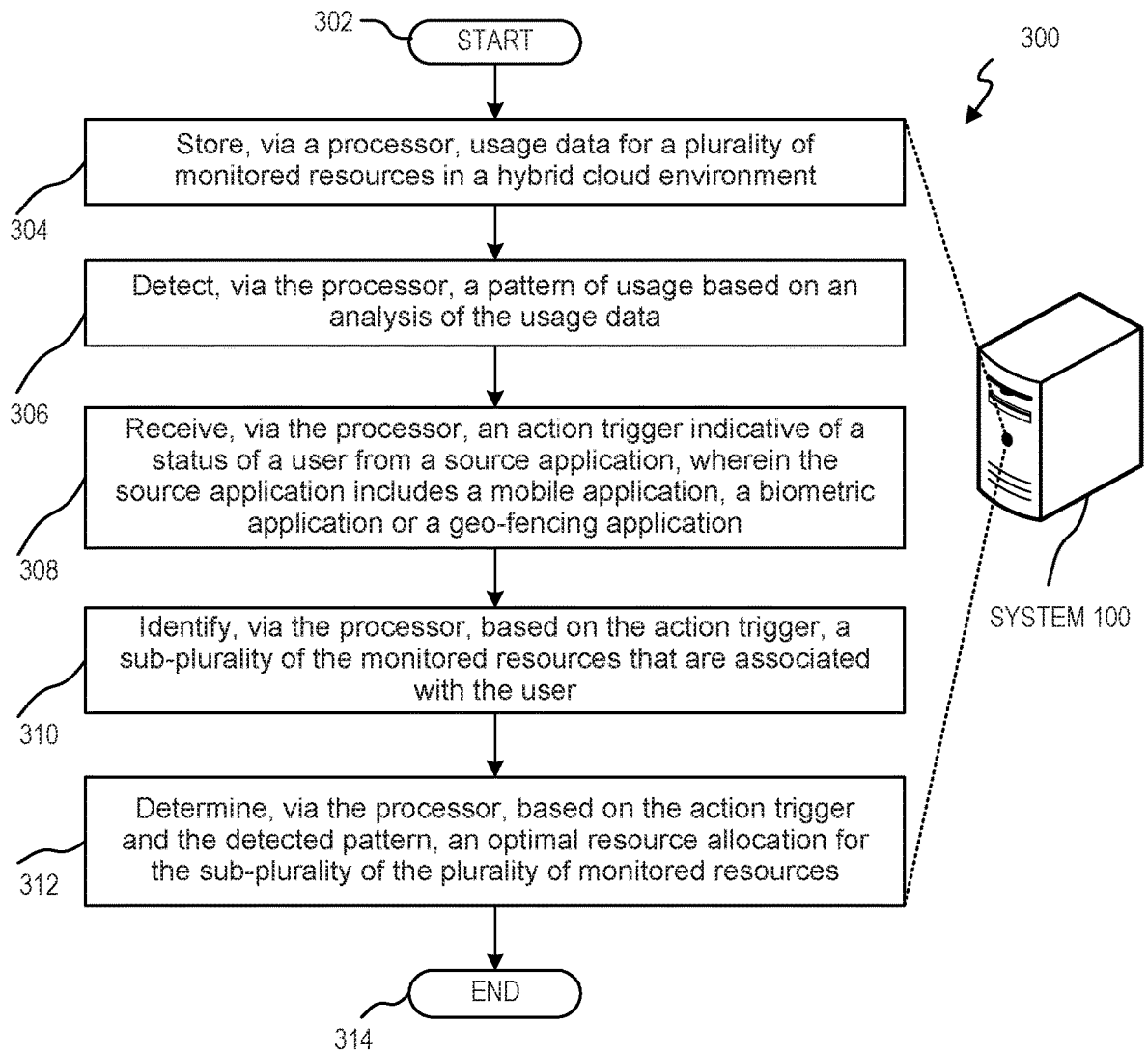
FIG. 3 is a flow diagram illustrating one example of a method for resource management in a cloud environment.

FIG. 3 is a flow diagram illustrating one example of a method for resource management in a cloud environment. In some examples, such an example method may be implemented by a system such as, for example, system 100 of FIG. 1, and/or system 200 of FIG. 2. The method 300 may begin at block 302, and continue to end at block 314.

At 304, usage data for a plurality of monitored resources in a hybrid cloud environment may be stored.

At 306, a pattern of usage may be detected based on an analysis of the usage data.

At 308, an action trigger indicative of a status of a user may be received from a source application, where the source application includes a mobile application, a biometric application or a geo-fencing application.

At 310, based on the action trigger, a sub-plurality of the monitored resources that are associated with the user may be identified.

At 312, based on the action trigger and the detected pattern, an optimal resource allocation for the sub-plurality of the plurality of monitored resources may be determined.

As described herein, in some examples, the method may include providing, based on the determination of the optimal resource allocation, a recommendation for deployment or non-deployment of the sub-plurality of the plurality of monitored resources.

In some examples, the method may include identifying the source application, and retrieving, based on the identified source application, an activity status for the sub-plurality of the plurality of monitored resources.

In some examples, the method may include determining that the action trigger is not received from a first source application, and prompting another source application to provide the action trigger.

In some examples, the storing the usage data for the plurality of monitored resources may include monitoring an activity status for the plurality of resources, and retrieving the usage data based on the activity status.

In some examples, the determining the optimal resource allocation for the sub-plurality of the plurality of monitored resources may include reallocating the sub-plurality of the plurality of monitored resources.

In some examples, the determining the optimal resource allocation for the sub-plurality of the plurality of monitored resources may include reclaiming the sub-plurality of the plurality of monitored resources.

In some examples, the determining the determining the optimal resource allocation for the sub-plurality of the plurality of monitored resources may be based on a usage policy. In some examples, the usage policy may be temporal, spatial, associated with the plurality of monitored resources, associated with an organization to which the user belongs, or associated with the user.

Figure 4:
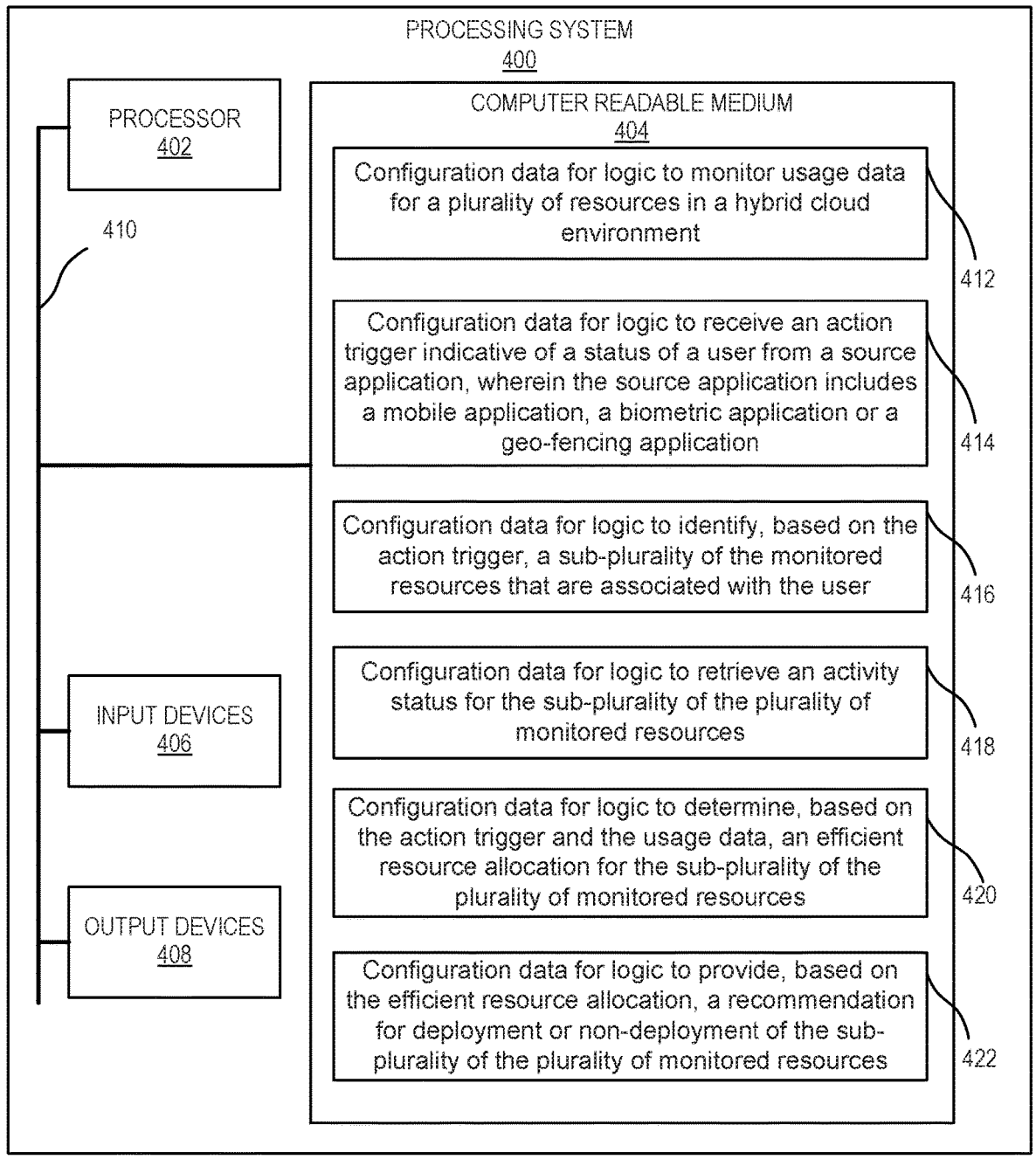
FIG. 4 is a block diagram illustrating one example of a computer readable medium for resource management in a cloud environment.

FIG. 4 is a block diagram illustrating one example of a computer readable medium for resource management in a cloud environment. Processing system 400 includes a processor 402, a computer readable medium 404, input devices 406, and output devices 408. Processor 402, computer readable medium 404, input devices 406, and output devices 408 are coupled to each other through a communication link (e.g., a bus). In some examples, the non-transitory, computer readable medium 404 may store configuration data for the logic to perform the various functions of the processor 402.

Processor 402 executes instructions included in the computer readable medium 404 that stores configuration data for logic to perform the various functions. Computer readable medium 404 stores configuration data for logic 412 to monitor usage data for a plurality of resources in a hybrid cloud environment.

Computer readable medium 404 stores configuration data for logic 414 to receive an action trigger indicative of a status of a user from a source application, where the source application includes a mobile application, a biometric application or a geo-fencing application. In some examples, the configuration data for logic 414 to receive the action trigger may include logic to determine that the action trigger is not received from a first source application, and prompt another source application to provide the action trigger.

Computer readable medium 404 stores configuration data for logic 416 to identify, based on the action trigger, a sub-plurality of the monitored resources that are associated with the user.

Computer readable medium 404 stores configuration data for logic 418 to retrieve an activity status for the sub-plurality of the plurality of monitored resources.

Computer readable medium 404 stores configuration data for logic 420 to determine, based on the action trigger and the usage data, an optimal resource allocation for the sub-plurality of the plurality of monitored resources.

Computer readable medium 404 stores configuration data for logic 422 to provide, based on the optimal resource allocation, a recommendation for deployment or non-deployment of the sub-plurality of the plurality of monitored resources.

In some examples, computer readable medium 404 includes instructions to detect a pattern based on the usage data, and provide the recommendation for deployment or non-deployment of the sub-plurality of the plurality of monitored resources based on the detected pattern.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 404 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage containers.

As described herein, various components of the processing system 400 are identified and refer to a combination of hardware and programming to perform a designated visualization function. As illustrated in FIG. 2, the programming may be processor executable instructions stored on tangible computer readable medium 404, and the hardware may include Processor 402 for executing those instructions. Thus, computer readable medium 404 may store program instructions that, when executed by Processor 402, implement the various components of the processing system 400.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 404 may be any of a number of memory components capable of storing instructions that can be executed by processor 402. Computer readable medium 404 may be non-transitory in the sense that it does not encompass a transitory signal but instead is made up of memory components to store the relevant instructions. Computer readable medium 404 may be implemented in a single device or distributed across devices. Likewise, processor 402 represents any number of processors capable of executing instructions stored by computer readable medium 404. Processor 402 may be integrated in a single device or distributed across devices. Further, computer readable medium 404 may be fully or partially integrated in the same device as processor 402 (as illustrated), or it may be separate but accessible to that device and processor 402. In some examples, computer readable medium 404 may be a machine-readable storage medium.

Although specific examples have been illustrated and described herein, there may be a variety of alternate and/or equivalent implementations that may be substituted for the specific examples shown and described without departing from the scope of the present disclosure. Network bandwidth is very crucial in any cloud environment. The techniques described herein allow for resources to be provisioned in areas where it they required rather than keep them running all the time. Resources may be made available when users need to use them. This application is intended to cover any adaptations or variations of the specific examples discussed herein.

The invention claimed is:

1. A system comprising:
a processor; and
a non-transitory storage medium storing instructions executable on the processor to:
receive, from a source application, a first action trigger indicative of a physical presence or physical absence of a user at a geographical location;
retrieve an activity status for a resource of a plurality of resources in a cloud environment;
receive, from a biometric application, a second action trigger indicating that a biometric verification has been performed of the user; and
provide, based on the first action trigger, the second action trigger, and the activity status, a recommendation for deployment or non-deployment of the resource.

2. The system of claim 1, wherein the instructions to receive the first action trigger include instructions to identify the source application, and the instructions to retrieve the activity status include instructions to retrieve the activity status based on the identified source application.

3. The system of claim 1, wherein the instructions to receive the first action trigger include instructions to:
determine that the first action trigger is not received from a first source application; and
prompt another source application to provide the first action trigger.

4. The system of claim 1, wherein the instructions are executable on the processor to:
collect usage data for the plurality of resources in the cloud environment; and
detect a pattern based on the collected usage data,
wherein the instructions to provide the recommendation for the deployment or non-deployment of the resource are based on the detected pattern.

5. The system of claim 1, wherein the instructions to provide the recommendation for the deployment or non-deployment of the resource include instructions to reallocate or reclaim the resource.

6. The system of claim 1, wherein the instructions are executable on the processor to provide the recommendation for the deployment or non-deployment of the resource based on a usage policy.

7. The system of claim 1, wherein the first action trigger is based on physical movement of the user as tracked by the source application, and wherein the instructions are executable on the processor to:
determine, responsive to the first action trigger, that the user has arrived at a work environment or has left the work environment;
based on determining that the user has arrived at the work environment, activate the resource; and
based on determining that the user has left the work environment, deactivate the resource.

8. A method performed by a system comprising a hardware processor, comprising:
storing usage data for a plurality of monitored resources in a hybrid cloud environment;
detecting a pattern of usage based on an analysis of the usage data;
determining that an action trigger indicative of a status of a user has not been received from a first source application;
prompting a second source application to provide the action trigger, wherein the second source application includes a mobile application, a biometric application, or a geo-fencing application;
identifying based on the action trigger, a sub-plurality of the monitored resources, the sub-plurality of the monitored resources being associated with the user; and
determining based on the action trigger and the detected pattern, a resource allocation for the sub-plurality of the monitored resources.

9. The method of claim 8, further comprising providing, based on the resource allocation, a recommendation for deployment or non-deployment of the sub-plurality of the monitored resources.

10. The method of claim 8, further comprising:
identifying the second source application; and
retrieving, based on the identifying of the second source application, an activity status for the sub-plurality of the monitored resources.

11. The method of claim 8, wherein the storing the usage data for the plurality of monitored resources includes:
monitoring an activity status for the plurality of monitored resources; and
retrieving the usage data based on the activity status.

12. The method of claim 8, wherein the determining the resource allocation for the sub-plurality of the monitored resources includes reallocating the sub-plurality of the monitored resources.

13. The method of claim 8, wherein the determining the resource allocation for the sub-plurality of the monitored resources includes reclaiming the sub-plurality of the monitored resources.

14. The method of claim 8, wherein the determining the resource allocation for the sub-plurality of the monitored resources is based on a usage policy.

15. The method of claim 14, wherein the usage policy is temporal, spatial, associated with the plurality of monitored resources, associated with an organization to which the user belongs, or associated with the user.

16. A non-transitory computer readable medium comprising instructions that upon execution cause a system to:
monitor usage data for a plurality of resources in a cloud environment;
determine that an action trigger indicative of a status of a user has not been received from a first source application;
prompt a second source application to provide the action trigger, wherein the second source application includes a mobile application, a biometric application, or a geo-fencing application;
identify, based on the action trigger, a subset of the plurality of resources that are associated with the user;
retrieve an activity status for the subset of the plurality of resources;
determine, based on the action trigger and the usage data, a resource allocation for the subset of the plurality of resources; and
provide, based on the resource allocation, a recommendation for deployment or non-deployment of the subset of the plurality of resources.

17. The non-transitory computer readable medium of claim 16, wherein the instructions upon execution cause the system to:
detect a pattern based on the usage data; and provide the recommendation for the deployment or non-deployment of the subset of the plurality of resources based on the detected pattern.

18. The non-transitory computer readable medium of claim 16, wherein the action trigger is based on physical movement of the user as tracked by the second source application, and wherein the instructions upon execution cause the system to:
- determine, responsive to the action trigger, that the user has arrived at a work environment or has left the work environment;
- based on determining that the user has arrived at the work environment, activate the subset of the plurality of resources; and
- based on determining that the user has left the work environment, deactivate the subset of the plurality of resources.

\* \* \* \* \*